(12) United States Patent
Yokoyama

(10) Patent No.: US 8,879,076 B2
(45) Date of Patent: Nov. 4, 2014

(54) RECEIPT PRINTER, RECEIPT PRINTER CONTROL METHOD, AND RECORDING MEDIUM

(75) Inventor: Kazuyuki Yokoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 144 days.

(21) Appl. No.: 13/533,172

(22) Filed: Jun. 26, 2012

(65) Prior Publication Data

US 2013/0003097 A1    Jan. 3, 2013

(30) Foreign Application Priority Data

Jun. 29, 2011   (JP) .................................. 2011-144672

(51) Int. Cl.
*G06F 15/00* (2006.01)

(52) U.S. Cl.
USPC .......................................................... 358/1.13

(58) Field of Classification Search
CPC ..................................................... G06F 3/1297
USPC .......................................................... 358/1.13
See application file for complete search history.

(56) References Cited

U.S. PATENT DOCUMENTS 7,689,461 B2    3/2010  Minowa
2005/0271446 A1* 12/2005  Minowa ....................... 400/621

FOREIGN PATENT DOCUMENTS

| JP | 2005-335125 A | 12/2005 |
| JP | 2006-035729 A | 2/2006 |
| JP | 2007-038557 A | 2/2007 |
| JP | 2007-047898 A | 2/2007 |

* cited by examiner

*Primary Examiner* — Saeid Ebrahimi Dehkordy
(74) *Attorney, Agent, or Firm* — Kilpatrick Townsend & Stockton LLP

(57) ABSTRACT

A receipt printer can print continuously without creating a top margin even when the presence or content of the header changes. The receipt printer has a preprint data storage unit that stores preprint data, a print data acquisition unit that acquires print data, a header evaluation unit that determines if the header data in the acquired print data and the preprint data are the same, and a print control unit that controls a print unit and a paper cutter unit. When the evaluation result is that the data are identical, the print control unit drives the print unit to print the preprint data after printing the portion of the acquired print data not including the header data. If the result is that the data are not-identical, the print unit prints the preprint data after printing the acquired print data.

12 Claims, 19 Drawing Sheets

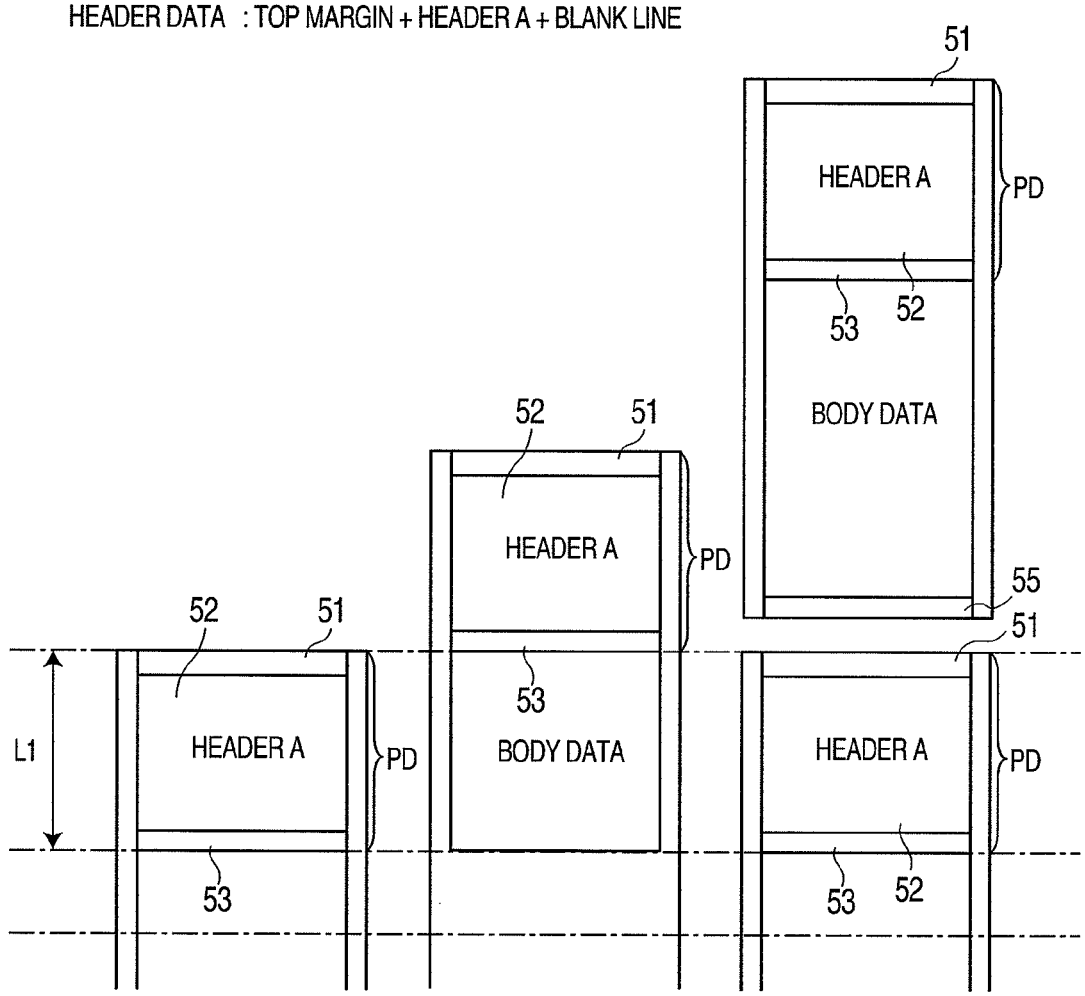

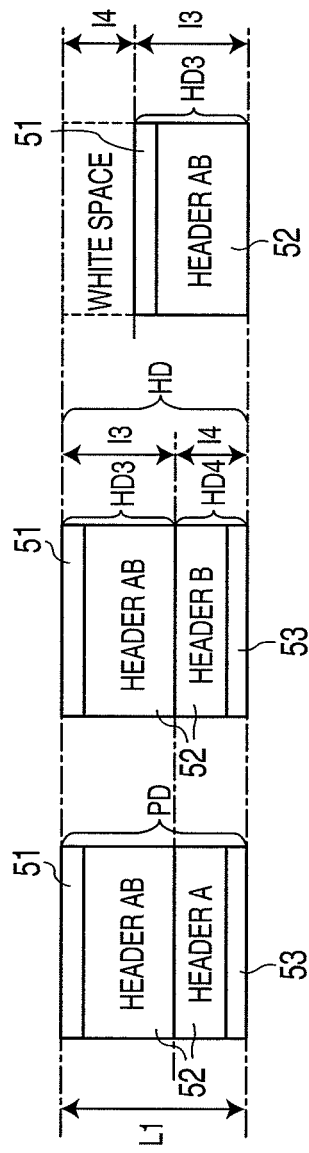

RECEIPT PRINTER, RECEIPT PRINTER CONTROL METHOD, AND RECORDING MEDIUM

Priority is claimed under 35 U.S.C. §119 to Japanese Application No. 2011-144672 filed on Jun. 29, 2011 which is hereby incorporated by reference in their entirety.

BACKGROUND

1. Technical Field

The present invention relates to a receipt printer that has a paper cutting position downstream from the printing position, prints specific content that is part of the next receipt after finishing printing the print data for one receipt, and then cuts the paper. The invention also relates to a method of controlling the receipt printer, and to a recording medium.

2. Related Art

Receipt printers that have a printhead and a paper cutter disposed with a cutter margin on the downstream side of the printhead, print specific previously stored logo data triggered by receiving a cut command after finishing printing the received print data, and then cut the paper are known from the literature. See, for example, Japanese Unexamined Patent Appl. Pub. JP-A-2007-047898.

By printing a length equal to the cutter margin in preparation for the next print job before cutting the paper in a printer that has such a cutter margin, creating a blank space (top margin) of a length equal to the cutter margin at the leading end of the next printout can be prevented. The top logo data is previously received and stored locally by the receipt printer. The top logo data is only sent to the printer when the print content of the top logo changes or when receipt printer memory has been cleared, and only print data not including the top logo data is transmitted during normal receipt printing.

Receipt printers may also be used to produce content other than simple sales receipts, including tax receipts, credit card transaction receipts, and coupons, as needed. Such irregular print jobs may have a header (top logo) with different content than a sales receipt, or no header. With the printer configuration described above, however, a process that overwrites the print data previously stored for printing a header must be performed before printing starts in order to change the header content or change whether or not a header is printed. In addition, because the print data must be overwritten whenever print data for printing a header is received, an unnecessary print data writing process is performed when print data for printing the same header is received.

SUMMARY

A receipt printer, receipt printer control method, and recording medium according to the invention enable continuing printing without producing a top margin whether or not a header is printed or the header content changes.

A receipt printer according to one aspect of the invention is a receipt printer that has a paper cutting position disposed a specific distance downstream from the printing position, prints in a top margin equal to this specific distance in the next receipt after completing printing the print data for one receipt, and then cuts the paper, and includes: a preprint data storage unit that stores preprint data for printing in the top margin of the next receipt; a print data acquisition unit that acquires the print data from a host device; a header evaluation unit that determines if header data, which is the data in the top margin portion of the acquired print data, and the preprint data, are identical; and a print control unit that controls a print unit and a paper cutter unit according to the result from the header evaluation unit. When the result from the header evaluation unit is identical, the print control unit controls the print unit to print the preprint data after printing the remaining data, which is the acquired print data minus the header data, and then controls the paper cutter unit to cut the paper, and when the result from the header evaluation unit is not-identical, causes the print unit to print the preprint data after printing the acquired print data, and then causes the paper cutter unit to cut the paper.

Another aspect of the invention is a control method for a receipt printer that has a paper cutting position disposed a specific distance downstream from the printing position, prints in a top margin equal to this specific distance in the next receipt after completing printing the print data for one receipt, and then cuts the paper, the receipt printer including: a preprint data storage step that stores preprint data for printing in the top margin of the next receipt; a print data acquisition step that acquires the print data from a host device; a header evaluation step that determines if header data, which is the data in the top margin portion of the acquired print data, and the preprint data, are identical; and a print control step that controls a print unit and a paper cutter unit according to the result from the header evaluation step. When the result from the header evaluation step is identical, the receipt printer prints the preprint data after printing the remaining data, which is the acquired print data minus the header data, using the print unit, and then cuts the paper using the paper cutter unit, and when the result from the header evaluation step is not-identical, the receipt printer prints the preprint data after printing the acquired print data using the print unit, and then cuts the paper using the paper cutter unit.

Another aspect of the invention is a computer-readable recording medium storing a program that causes a computer to execute the steps of the receipt printer control method described above.

These aspects of the invention compare the header data contained in the received print data with previously stored preprint data, and only if these are not-identical (not the same) print the header data contained in the received print data. As a result, receipts can be printed as desired without individually sending and rewriting the preprint data even if the content printed in the header changes. Receipts can therefore be continuously printed as desired without creating a top margin even if the presence or content of a header changes. In addition, because the previously stored preprint data is printed before the paper is cut, a process of writing the header data over the original data can be omitted when printing irregular print jobs in which the header content differs only for that job.

Preferably, the receipt printer also has a data overwriting unit that, when the result from the header evaluation unit is not-identical, overwrites the preprint data with the header data in the acquired print data before the start of printing controlled by the print control unit.

This aspect of the invention enables changing the content printed in the header of the current print job while also changing the content printed in the next and following headers by sending print data without separately sending and overwriting the preprint data.

Further preferably, the receipt printer also has a counter unit that counts the number of consecutive times the result from the header evaluation unit is not-identical, and the data overwriting unit overwrites the preprint data when the count of the counter unit is greater than or equal to a specific number.

When printing an irregular print job with different header content only once, for example, this aspect of the invention is more convenient because the preprint data, which is print data for the next and following headers, is not overwritten.

Note that the receipt printer preferably also has an operating unit for setting the value used as the "number of times."

Further preferably, when printing the acquired print data when the evaluation result is not-identical, the print control unit of the receipt printer controls the paper cutter unit to cut the paper after causing the print unit to print the header data, and then controls the print unit to print the remaining data, which is the print data minus the header data.

This configuration can automatically remove the unnecessary preprinted portion.

Further preferably, the receipt printer also has a print data editing unit that, when a blank line at least one dot wide extending in the receipt width direction is contained in the header data, divides the header data into first header data from the leading end of the header data to the trailing end of the blank line, and second header data from the trailing end of the blank line to the trailing end of the header data, and adds white space data equal to the length of the second header data to the leading end of the first header data; and the data overwriting unit overwrites the preprint data with the first header data to which the white space data was added.

Because the first header data having white space added to the leading end is preprinted when the regular portion (corresponding to the first header data) printed on a receipt is shorter than the top margin in this configuration, the trailing end of the regular portion matches the printing position after preprinting ends. As a result, printing starts next from the border between the regular portion and the printed part other than the regular portion, and creating a line printed as a result of a shift in the paper feed pitch in the printed part outside the regular portion can be prevented.

Further preferably, the receipt printer also has a data generating unit that, when the result from the header evaluation unit is not-identical and part of the header data and preprint data match, generates converted header data by converting the remaining part of the header data other than the matching part to white space data; and the data overwriting unit overwrites the preprint data with the converted header data.

Yet further preferably, the receipt printer also has a common data storage unit that, when the result from the header evaluation unit is not-identical and part of the header data and the preprint data match, stores the matching part as common data. When data is stored in the common data storage unit, the header evaluation unit determines if the common data is contained in the header data of the acquired print data, and the print control unit controls the print unit to print the preprint data after printing the remaining data, which is the print data minus the common data, and then controls the paper cutter unit to cut the paper.

Because only the matching parts of the header data and preprint data are preprinted, this aspect of the invention can use the preprinted result in the next print job even if the header data and the preprint data in the next print job do not match completely. Note that the matching part (identical part) is the leading end portion of the header data and preprint data, and white space of the same length as the non-matching portion, which is the header data minus the identical data, is added to the leading end of the matching part. As a result, creating white space between the matching part of the preprinted header data and the non-matching part printed in the next print operation can be prevented.

Further preferably, when printing immediately after a paper replacement process, paper feed process, or power on process, the print control unit controls the print unit to print the preprint data after printing the acquired print data regardless of the result from the header evaluation unit, and then controls the paper cutter unit to cut the paper.

When the paper with the preprinted header portion is lost, or the trailing end of the header portion is conveyed to a position downstream from the printing position, this configuration enables printing a desirable receipt by printing the header data contained in the acquired print data.

A receipt printer according to another aspect of the invention preferably also has a mode switching unit that changes the operating mode between a preprinting mode that prints the preprint data before cutting the paper, and a preprinting pause mode that does not print the preprint data before cutting the paper; and the print control unit functions only in the preprinting mode.

This configuration enables the user to select whether preprinting is used. For example, consuming paper by unnecessary preprinting operations can be prevented by selecting the preprinting pause mode when printing continuously without a header. Note that the mode may be changed by performing a specific operation on the receipt printer, by sending a control command from the host device, or by changing a setting of the printer driver, for example.

BRIEF DESCRIPTION OF THE DRAWINGS

FIG. 8 shows sample printouts when the preprint data and the header data are the same.

FIG. 16 describes generating the preprint data.

DESCRIPTION OF EMBODIMENTS

A receipt printer and method of controlling a receipt printer according to preferred embodiments of the present invention are described below with reference to the accompanying figures. The receipt printer of the invention is used connected to a host device, and produces receipts by printing and cutting continuous paper (paper) based on print data acquired from the host device.

Figure 1:
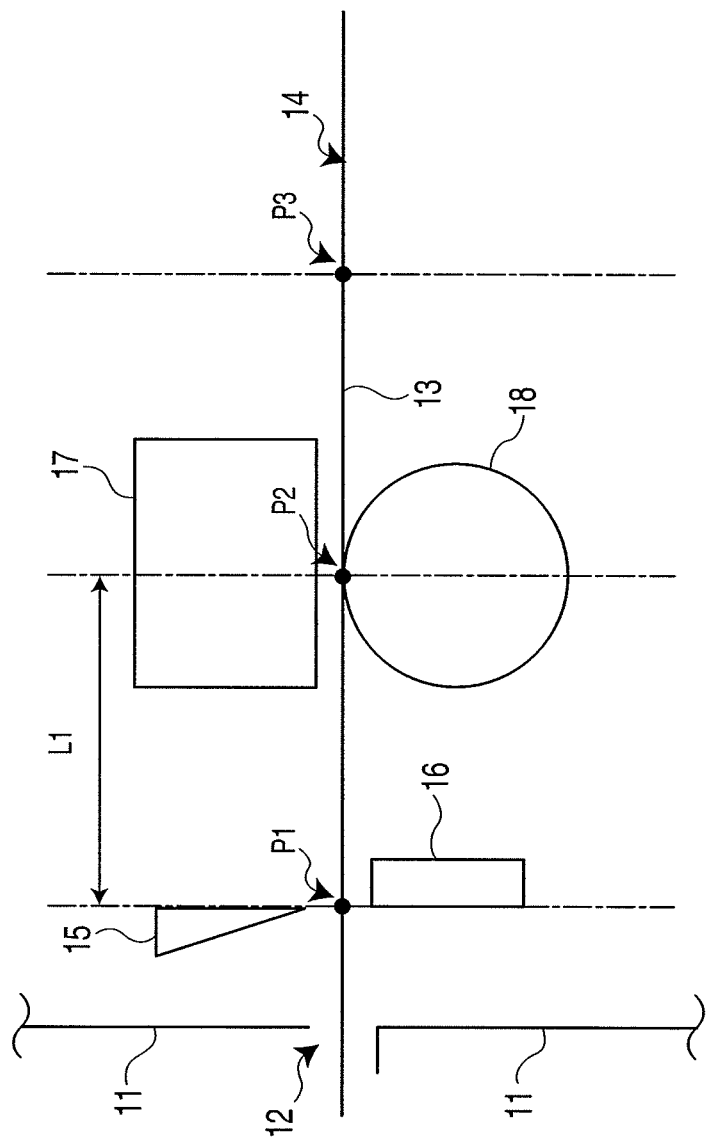
FIG. 1 is a schematic section view of main parts of a receipt printer according to a first embodiment of the invention.

FIG. 1 is a schematic section view showing main parts of the receipt printer 1. As shown in the figure, the receipt printer 1 has a conveyance path 14 that goes from a roll paper compartment not shown to the paper exit 12 inside the case 11, with a paper cutter mechanism including a movable cutter 15 and a fixed cutter 16, and a printhead 17, disposed from the downstream end of the conveyance path 14. The paper cutter mechanism includes the movable cutter 15 connected to a cutter motor 22 (FIG. 2), and the fixed cutter 16 disposed opposite the movable cutter 15 with the paper 13 therebetween. The paper cutter mechanism cuts the paper at paper cutting position P1 by driving the cutter motor 22 and causing the movable cutter 15 to descend.

The printhead 17 is a thermal head, and prints on paper 13 with a thermal coating at the printing position P2. A platen 18 is disposed to a position opposite the printhead 17 with the paper 13 therebetween, and the platen 18 presses the paper 13 to the printhead 17 when printing.

The distance from the paper cutting position P1 to the printing position P2 is L1.

The receipt printer 1 prints using the printhead 17 while conveying the paper 13 through the conveyance path 14 by a paper conveyance mechanism not shown. Because the paper cutting position P1 is located distance L1 downstream from the printing position P2 as described above, white space (a top margin) of length L1 will be created on the printed receipt if printing starts when the leading end of the paper 13 is at the paper cutting position P1. In order to prevent creating this top margin, the receipt printer 1 according to the invention cuts the paper after preprinting content to length L1 in preparation for printing the next receipt after finishing printing one receipt.

Figure 2:
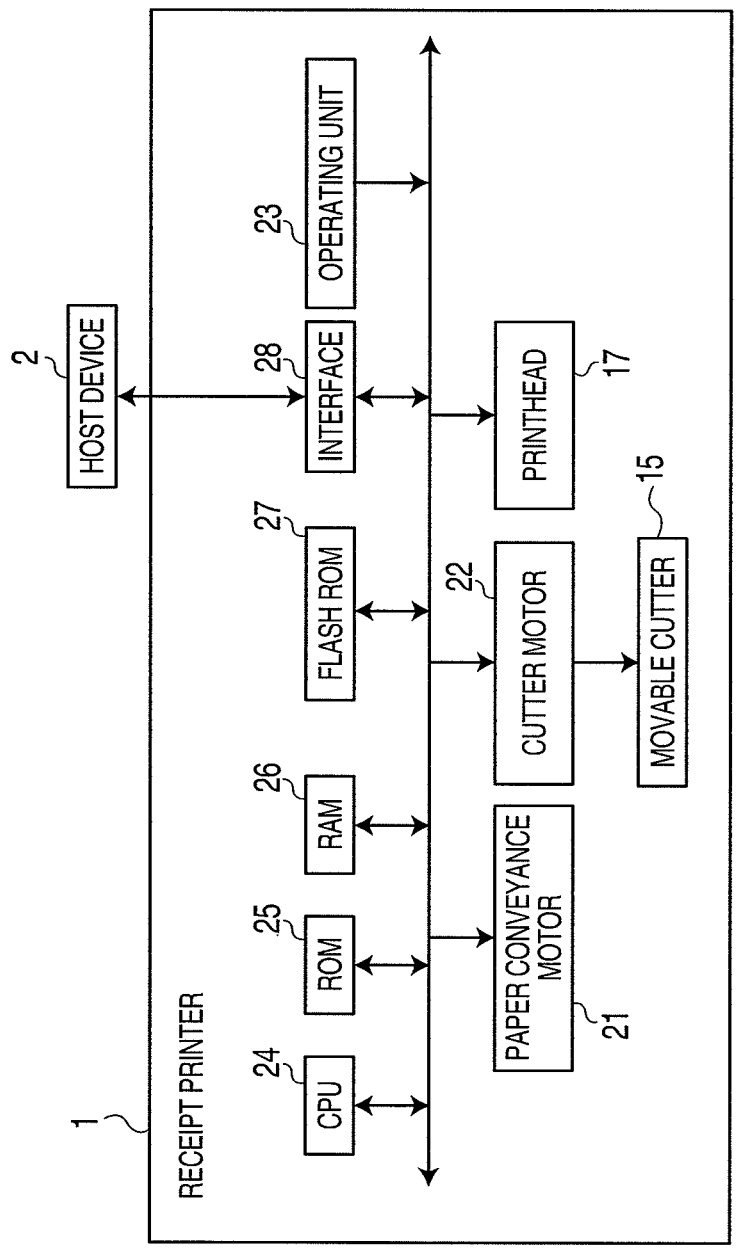
FIG. 2 is a block diagram showing the control configuration of the receipt printer.

FIG. 2 is a block diagram showing the control configuration of the receipt printer 1. As shown in the figure, the receipt printer 1 includes a paper conveyance motor 21, cutter motor 22, printhead 17, operating unit 23, CPU 24 (central processing unit), ROM 25 (read-only memory), RAM 26 (random access memory), flash ROM 27, and an interface 28.

The paper conveyance motor 21 causes the plural rollers not shown of the paper conveyance mechanism to rotate and convey the paper 13 through the conveyance path 14.

The cutter motor 22 causes the movable cutter 15 described above to descend and cut the paper 13.

The operating unit 23 includes a plurality of operating members disposed to the case 11, and is used to turn the receipt printer 1 power on/off and perform various operations. The operating unit 23 in this embodiment is particularly used to switch between a normal mode in which preprinting occurs, and a preprinting pause mode in which preprinting does not occur.

The CPU 24 centrally controls receipt printer 1 operation by performing data processes.

Control data and a control program enabling the CPU 24 to perform the processes are stored in ROM 25.

RAM 26 is used as working memory for the CPU 24 to execute the data processes.

The flash ROM 27 has storage areas for storing the preprint data PD for preprinting as described above, and common data described below.

The interface 28 is used to receive print data from the host device 2.

Figure 3:
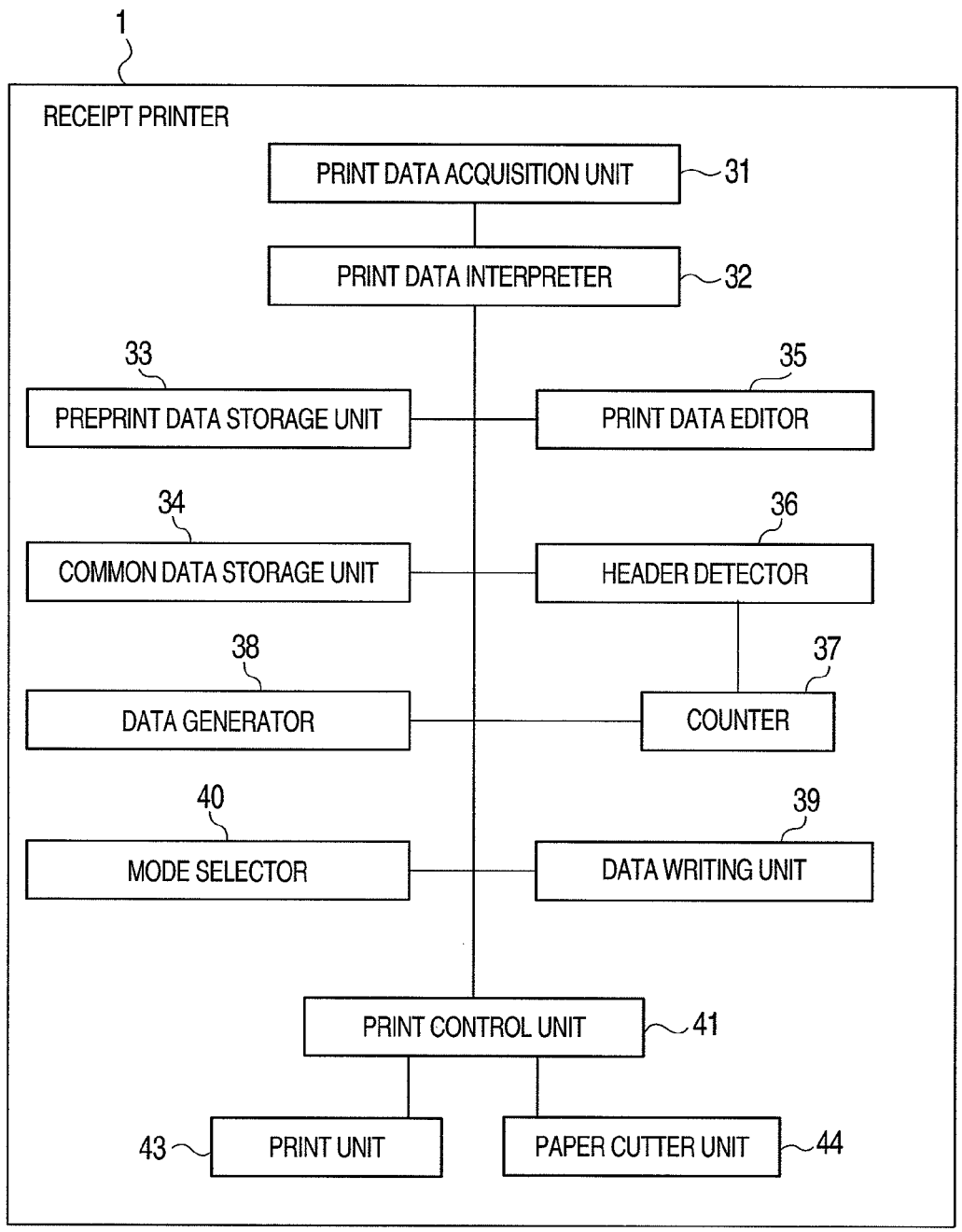
FIG. 3 is a block diagram showing the functional configuration of the receipt printer.

FIG. 3 is a block diagram showing the functional configuration of the receipt printer 1. As shown in the figure, the receipt printer 1 includes a print data acquisition unit 31, print data interpreter 32, preprint data storage unit 33, common data storage unit 34, print data editor 35, header detector 36, counter 37, data generator 38, data writing unit 39, mode selector 40, print control unit 41, print unit 43, and paper cutter unit 44.

The print data acquisition unit 31 mainly includes the interface 28, and acquires print data for printing a receipt from the host device 2. The print data interpreter 32 interprets the acquired print data, and extracts the header data HD.

Figure 4:
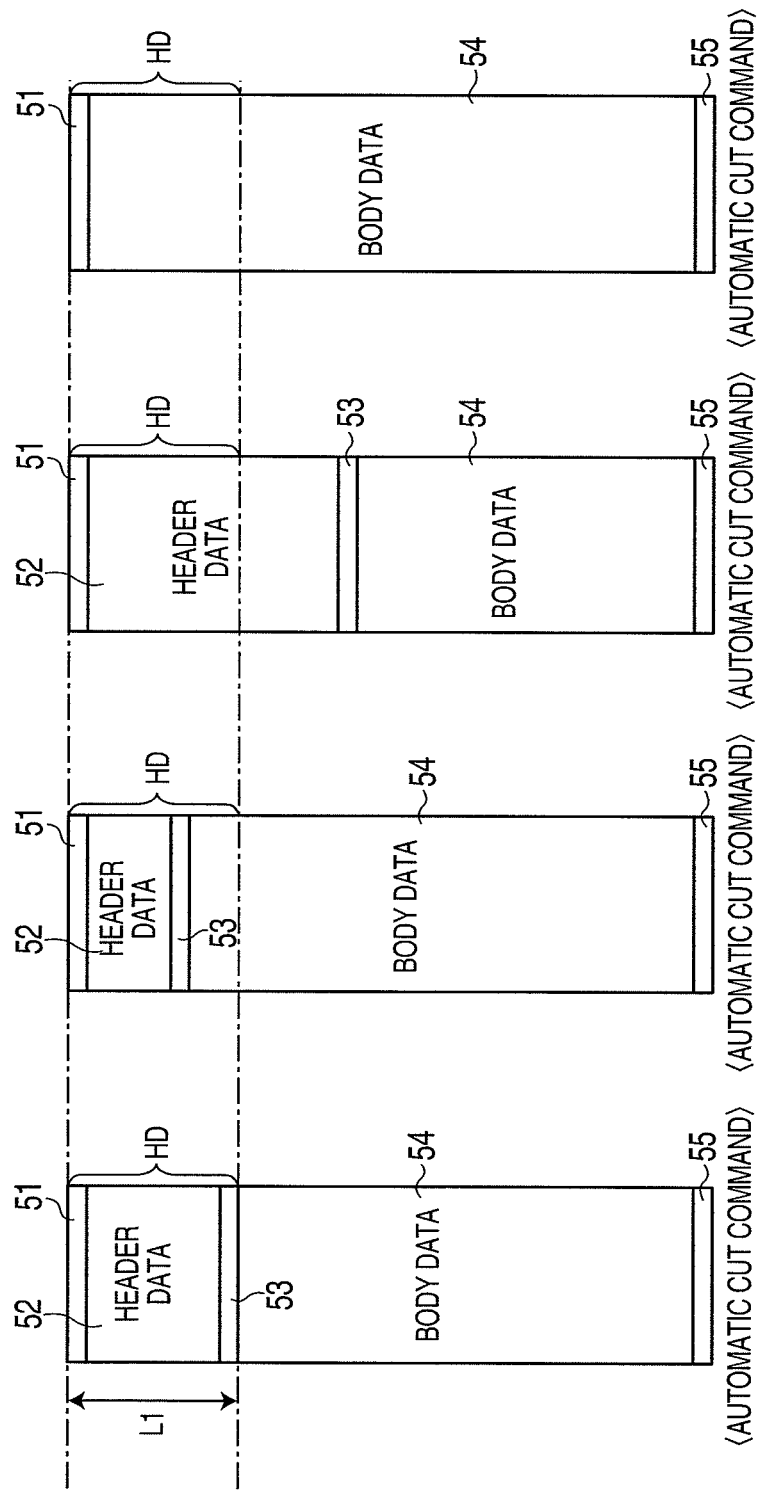
FIG. 4 shows different patterns of print data acquired from the host device.

FIG. 4 shows typical examples of print data acquired from the host device 2. As shown in the figure, the print data includes a top margin 51, header logo 52, blank line 53, body data 54, a bottom margin 55, and a cut command.

The top margin 51 is white space between the leading end of the paper (the leading cut end) and the leading end of the printed body content. Note that the top margin 51 could be white space data or a command for advancing the paper a specific length.

The header logo 52 is a regular part printed to each receipt, and includes store information, for example.

The blank line 53 marks the border between the regular header logo 52 and the body data 54.

The body data 54 is data that changes with each receipt, and includes payment information.

The bottom margin 55 is white space provided between the trailing end of the body data and the trailing end of the paper (the uncut end). The bottom margin 55 may be white space data or a command for advancing the paper a specific length.

The cut command is a command to cut the paper.

The print data interpreter 32 extracts the data in length L1 from the leading end of the acquired print data as the header data HD.

The length of the print data shown in FIG. 4A from the leading end of the top margin 51 to the trailing end of the blank line 53 is L1, and the data including the top margin 51, header logo 52, and blank line 53 therefore becomes the header data HD.

The distance from the leading end of the top margin 51 to a point in the body data 54 in the print data shown in FIG. 4B is L1, and data including the top margin 51, header logo 52, blank line 53, and part of the body data 54 therefore becomes the header data HD.

The length of the print data shown in FIG. 4C from the leading end of the top margin 51 to a point in the header logo 52 is L1, and the data including the top margin 51 and this part of the header logo 52 therefore becomes the header data HD.

In the print data shown in FIG. 4D, length L1 is the distance from the leading end of the top margin 51 to a point in the body data 54, and the data including the top margin 51 and this part of the body data 54 therefore becomes the header data HD. Note that this print data does not include the header logo 52 and blank line 53, and is print data for a printout that does not have a header, such as a sales report or coupon. The receipt printer 1 thus gets plural different types of print data from the host device 2.

The print data interpreter 32 extracts the header data HD as described above, and determines if a blank line 53 is contained in the extracted header data HD. Note that this does not include when the trailing end of the blank line 53 matches the trailing end of the header data HD. When print data for plural print jobs is acquired from the host device 2, the print data interpreter 32 uses the data preceding each cut command in the print data as the print data for one receipt, and applies this data analysis to the print data for each receipt.

Referring again to FIG. 3, the preprint data storage unit 33 is a memory area in flash ROM 27, and nonvolatilely, rewritably stores the preprint data PD for printing as described above. Note that the preprint data PD is data of length L1 for printing in the top margin of the receipt.

The header detector 36 determines if the header data HD extracted by the print data interpreter 32 is identical to the preprint data PD stored in the preprint data storage unit 33. If determined to be not identical, the header detector 36 determines if the data continuing from the beginning of the header data HD and the preprint data PD is the same. More specifically, it determines if the data at the leading end of the header data HD and the leading end of the preprint data PD are the same. The counter 37 counts and stores how many times the header detector 36 determines that the data is not identical and the leading end parts of the data are not the same.

The data writing unit 39 rewrites the data stored in the preprint data storage unit 33 as required. If the count n stored by the counter 37 equals or exceeds a specific number N in this embodiment, the preprint data PD is overwritten with the header data HD. If the data generator 38 described below generates preprint data PD, the preprint data PD that is already stored is overwritten with the generated data.

The print data editor 35 edits the acquired print data (see FIG. 13) if the print data interpreter 32 determines that a blank line 53 is contained in the header data HD (except when the trailing end of the blank line 53 coincides with the trailing end of the header data HD). This editing process is described below.

If the header detector 36 determines that the leading ends of the header data HD and preprint data PD match, the data generator 38 generates data to be stored as the new preprint data PD (see FIG. 16). This data generation process is described below.

Like the preprint data storage unit 33, the common data storage unit 34 is a memory area in flash ROM 27, and nonvolatilely, rewritably stores common data in the header data HD and preprint data PD that is extracted in the process of data generation by the data generator 38. Note that this common data is data located at the leading end of the header data HD and preprint data PD, and is print data of a length shorter than length L1.

The mode selector 40 changes the operating mode between a preprinting mode in which preprinting is performed, and a preprinting pause mode in which preprinting is not performed, based on an operating signal from the operating unit 23.

The print unit 43 includes the printhead 17 and paper conveyance mechanism, and prints the print data.

The paper cutter unit 44 is composed of the paper cutting mechanism, and cuts the paper.

The print control unit 41 controls the print unit 43 and paper cutter unit 44.

The printing processes of the receipt printer 1 are described next with reference to FIG. 5 to FIG. 19. The printing process of the receipt printer 1 when in the preprinting pause mode in which preprinting is not performed is described first with reference to FIG. 5 and FIG. 6.

Figure 5:
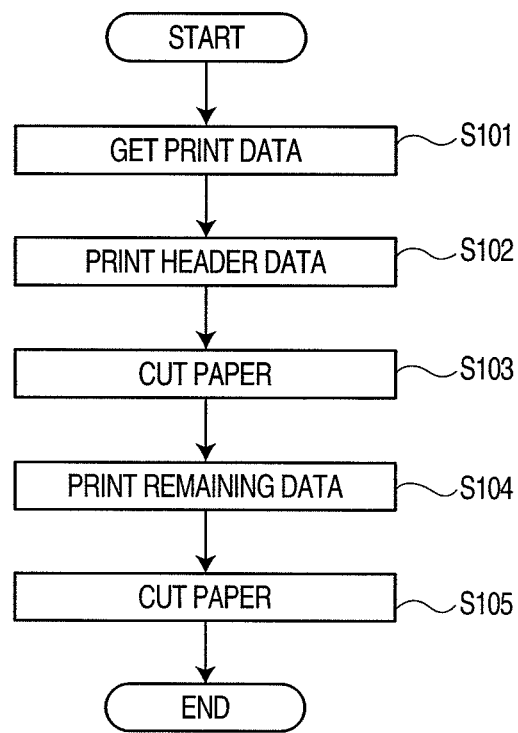
FIG. 5 is a flow chart of the printing process of the receipt printer in the preprinting pause mode.

As shown in FIG. 5, when print data is acquired (S101), the receipt printer 1 prints the header data HD contained in the print data (S102), and cuts the paper (S103). The receipt printer 1 then prints the remaining print data not including the header data HD (S104), and cuts the paper (S105).

Figures 6A, 6B, 6C:
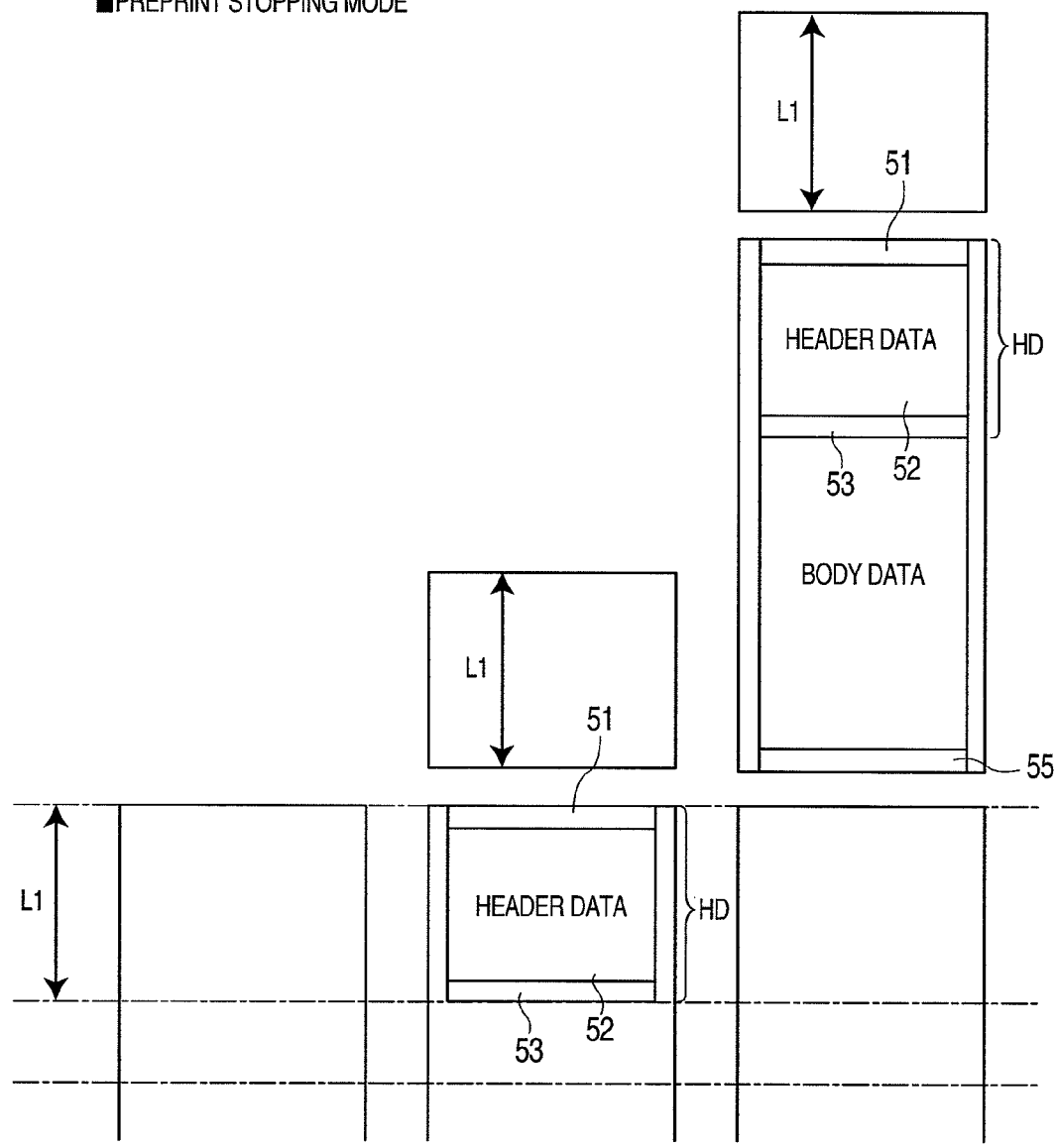
FIG. 6 shows sample printouts in the preprinting pause mode.

FIG. 6 shows an example of the printout resulting from the flow chart in FIG. 5. If the print data is acquired after the previous print job has ended with the leading end of the paper 13 at the paper cutting position P1 (FIG. 6A), the receipt printer 1 prints the header data HD of length L1 and cuts the paper (FIG. 6B). As a result, white space (a top margin) of length L1 is separated from the receipt. The remaining data is then printed, the paper cut, and a receipt is issued (FIG. 6C). Note that cutting the paper after printing the header data HD produces a piece of paper separate from the receipt and can be omitted. However, because data of some kind may have been preprinted to the top margin, the paper is preferably cut when printing immediately after the mode is changed to the preprinting pause mode.

Figure 7:
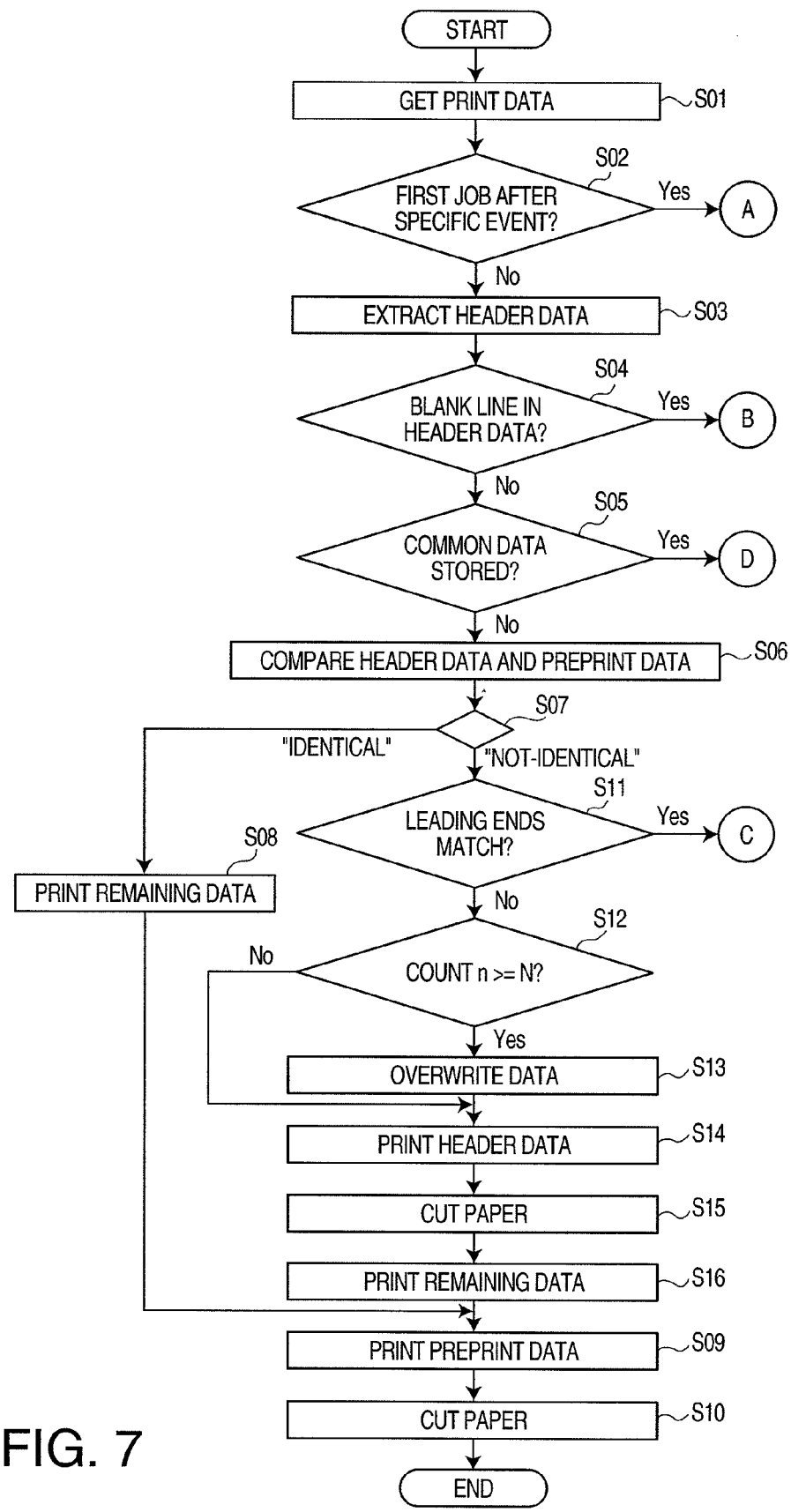
FIG. 7 is a flow chart of the printing process of the receipt printer.

The printing process of the receipt printer 1 when in the preprinting mode that performs preprinting is described next with reference to FIG. 7 to FIG. 19. As shown in FIG. 7, when print data is acquired from the host device 2 (S01), the receipt printer 1 goes to sequence A if this acquisition of print data was the first time print data was acquired after a specific event (S02 returns Yes). Note that a specific event means a paper replacement process, paper feed process, or a power on process.

However, if the acquisition of print data is not the first time after a specific event (S02 returns No), the receipt printer 1 extracts the header data HD from the print data (S03) and determines if a blank line 53 is present in the extracted header data HD (S04). If a blank line 53 is in the header data HD (except when the trailing end of the blank line 53 coincides with the trailing end of the header data HD) (S04 returns Yes), control goes to sequence B. If a blank line 53 is not in the header data HD (including when the trailing end of the blank line 53 coincides with the trailing end of the header data HD) (S04 returns No), whether or not common data is stored in the common data storage unit 34 is determined (S05). If common data is stored in the common data storage unit 34 (S05 returns Yes), control goes to sequence D. However, if common data is not stored in the common data storage unit 34 (S05 returns No), the receipt printer 1 compares the header data HD and preprint data PD (S06).

If the header data HD and preprint data PD are determined to be identical (S07 returns IDENTICAL), the remaining print data not including the header data HD is printed (S08), the preprint data PD is printed (S09), the paper is cut (S10), and the process ends.

FIG. 8 shows a sample printout when the header data HD and preprint data PD are determined to be identical in step S07 in FIG. 7. Note that this example describes using print data in which the length of the data including the top margin 51, header logo 52, and blank line 53 is length L1 as shown in FIG. 4A. The receipt printer 1 stores the top margin 51, a header A as the header logo, and a blank line 53 as the preprint data PD. The header data HD extracted from the acquired print data likewise includes the top margin 51, header logo 52, and blank line 53.

When print data is acquired after the preprint data PD was preprinted (see FIG. 8A), the receipt printer 1 prints only the part of the print data that is left after removing the header data HD (FIG. 8B). In this sample printout the remaining data is the body data 54 and the bottom margin 55. After finishing printing the remaining data, the preprint data PD stored in memory is preprinted before cutting the paper based on the cut command, and the paper is cut after preprinting is finished (FIG. 8C). More specifically, when the header data HD and the preprint data are the same, the receipt printer 1 prints a receipt using the portion that was previously printed. Triggered by the cut command contained in the print data, the stored preprint data is used to preprint the header in preparation for printing the next receipt.

Referring again to FIG. 7, if the header data HD and preprint data PD are determined to be not identical (S07 returns NOT IDENTICAL), whether or not the leading end part of the header data HD and preprint data PD are the same is determined (S11). If both leading ends are the same (S11 returns Yes), control goes to sequence C.

If both leading ends are not the same (S11 returns No), and the number of times n that "not identical" and "both leading ends are not the same" are determined consecutively is greater than or equal to the specific count N (S12 returns Yes), the preprint data PD is overwritten with the header data HD (S13). The header data HD is then printed (S14) and the paper is cut (S15). The remaining print data minus the header data HD is then printed (S16), the rewritten preprint data PD is printed (S09), and the paper is cut (S10).

FIG. 9 shows a sample printout when step S07 in FIG. 7 determines that the header data HD and preprint data PD are not identical, S08 determines the leading end parts of the header data HD and preprint data PD do not match, and the number of times n that "not identical" and "both leading ends are not the same" are determined consecutively is greater than or equal to the specific count N in S12. Note that this sample printout is described using print data in which the combined length of the top margin 51, header logo 52, and blank line 53 is length L1 as shown in FIG. 4A. The receipt printer 1 stores the top margin 51, header A as the header logo 52, and blank line 53 as the preprint data PD. The header data HD extracted from the acquired print data is composed of the top margin 51, header B as the header logo 52, and a blank line 53.

Figures 9A, 9B, 9C:
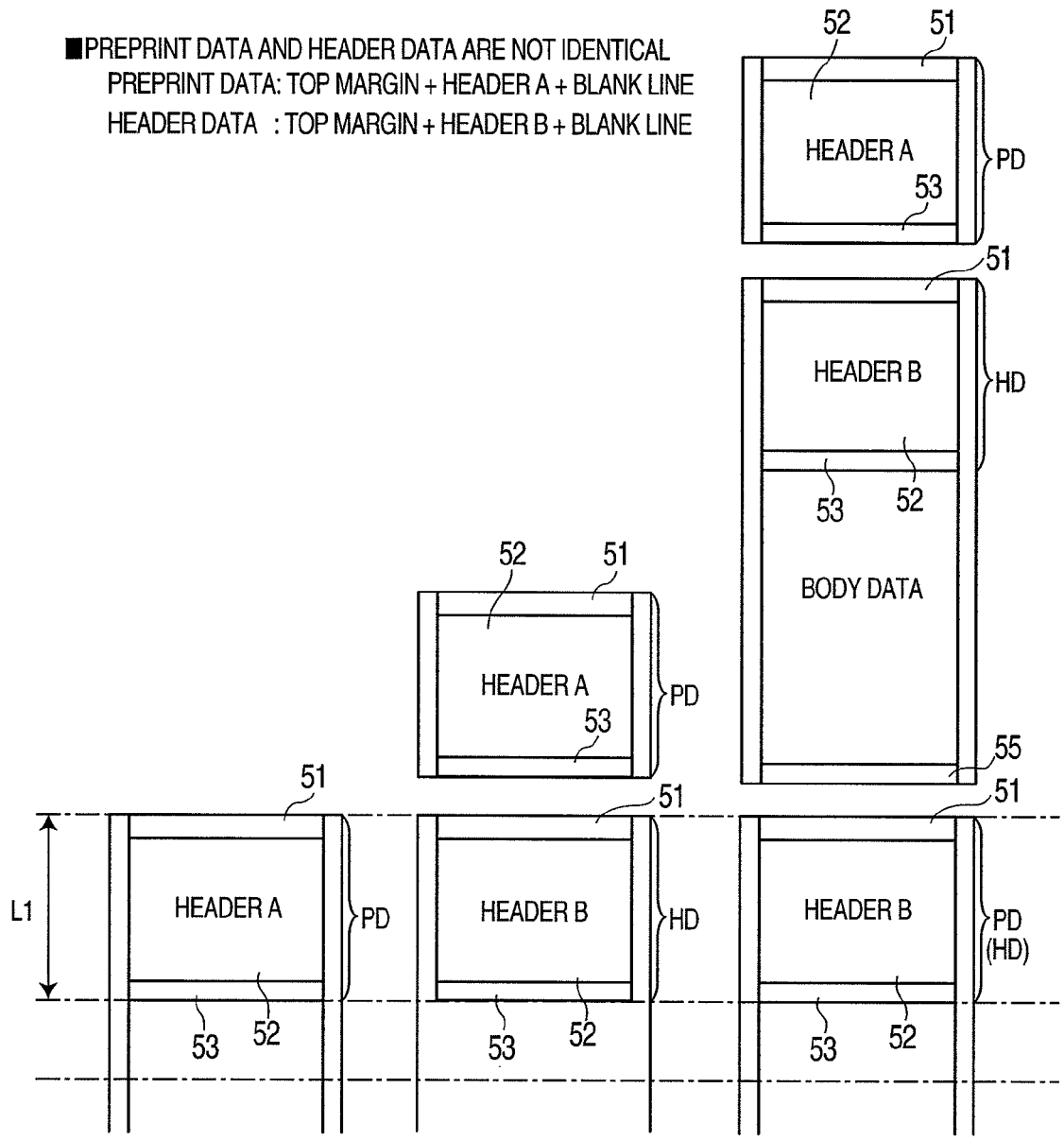
FIG. 9 shows sample printouts when the preprint data and the header data are not the same.

If the print data is acquired when the preprint data PD has been preprinted (FIG. 9A), the receipt printer 1 prints the header data HD contained in the print data and cuts the paper (FIG. 9B). After finishing printing the rest of the print data minus the header data HD, the rewritten preprint data PD is preprinted before cutting the paper based on the cut command, and the paper is then cut after preprinting is completed (FIG. 9C). More specifically, the receipt printer 1 separates the existing preprinted part (the preprint data PD including header A), and prints the print data including the new header data HD. Then in preparation for printing the next receipt, the rewritten preprint data PD (the new preprint data PD including header B) is preprinted.

Note that while not shown in the figure, the receipt printer 1 returns a not identical result when preprint data PD is not stored in the preprint data storage unit 33, stores the header data HD extracted from the print data as the preprint data PD in the preprint data storage unit 33, prints all acquired print data including the header data HD, and preprints the header data HD.

Figure 10:
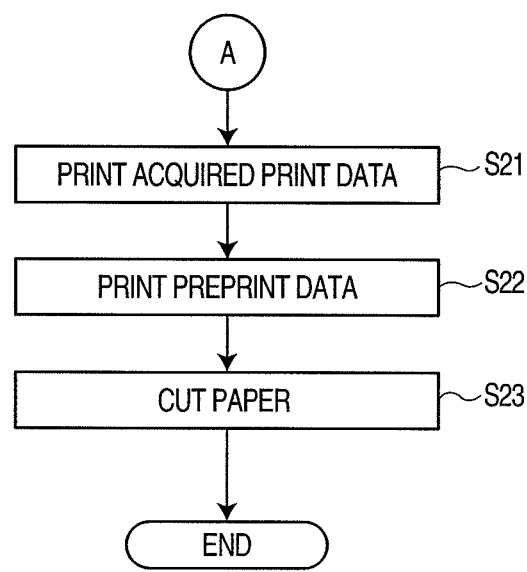
FIG. 10 is a flow chart of the printing process after a specific event.

Operation when S02 in FIG. 7 determines that print data is acquired for the first time after a specific event is described next with reference to FIG. 10 and FIG. 11. Note that a specific event here denotes replacing the paper, a paper feed process, and a power on process. Paper indexing and paper feed processes are also already completed in each process so that printing can start immediately. As shown in FIG. 10, the receipt printer 1 prints the acquired print data (S21), prints the preprint data (S22), and then cuts the paper (S23).

FIG. 11 shows a sample printout resulting from the process in FIG. 10. Note that this sample printout is also described using print data in which the length of the combined top margin 51, header logo 52, and blank line 53 is length L1 as shown in FIG. 4A. The receipt printer 1 stores the top margin 51, header A as the header logo 52, and a blank line 53 as the preprint data PD. The header data HD extracted from the acquired print data is composed of the top margin 51, header A as the header logo 52, and the blank line 53.

Figures 11A, 11B, 11C:
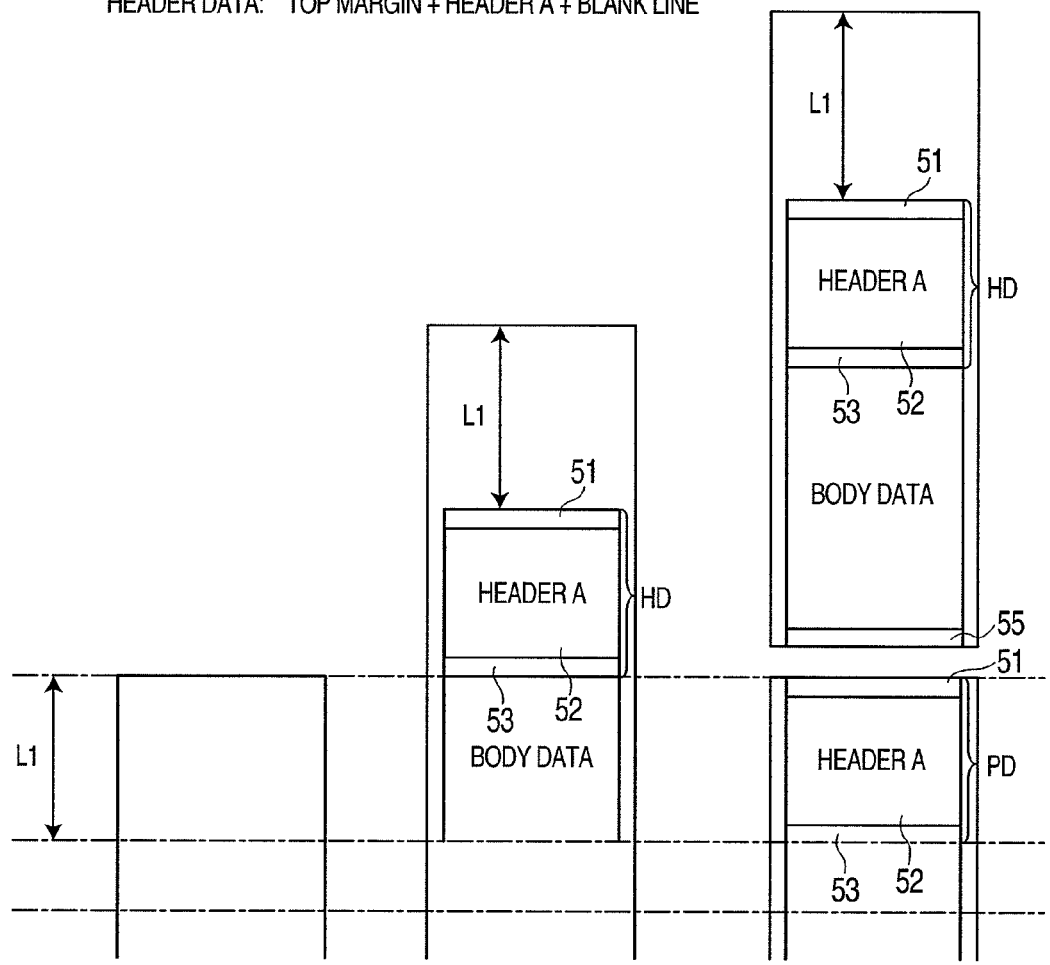
FIG. 11 shows a sample printout after a specific event.

With the leading end of the paper 13 reliably positioned to the paper cutting position P1 (FIG. 11A), the receipt printer 1 prints the acquired print data (FIG. 11B). After printing the print data ends and before cutting the paper based on the cut command, the receipt printer 1 preprints the stored preprint data PD, and cuts the paper after preprinting ends (FIG. 11C).

By always printing all of the acquired print data the first time print data is acquired after a specific event occurs, a suitable receipt can be printed even when the preprinted header portion cannot be used because the preprinted header was lost or the trailing end of the header portion is advanced and positioned downstream from the printing position P2, for example, as a result of replacing the paper, a paper feed process, or a power on process. The first receipt printed after a specific event is produced in this embodiment with a top margin of a length equal to L1. Note that the paper could be cut after printing the header data HD in order to remove this top margin.

A case in which step S04 in FIG. 7 determines there is a blank line 53 in the header data HD (including when the trailing end of the blank line 53 is coincident with the trailing end of the header data HD) is described next with reference to FIG. 12 to FIG. 14. More specifically, a case in which the length from the leading end of the top margin 51 to the trailing end of the blank line 53 is shorter than L1, and print data having part of the body data contained in the header data HD is acquired as shown in FIG. 4B, is described.

Figure 12:
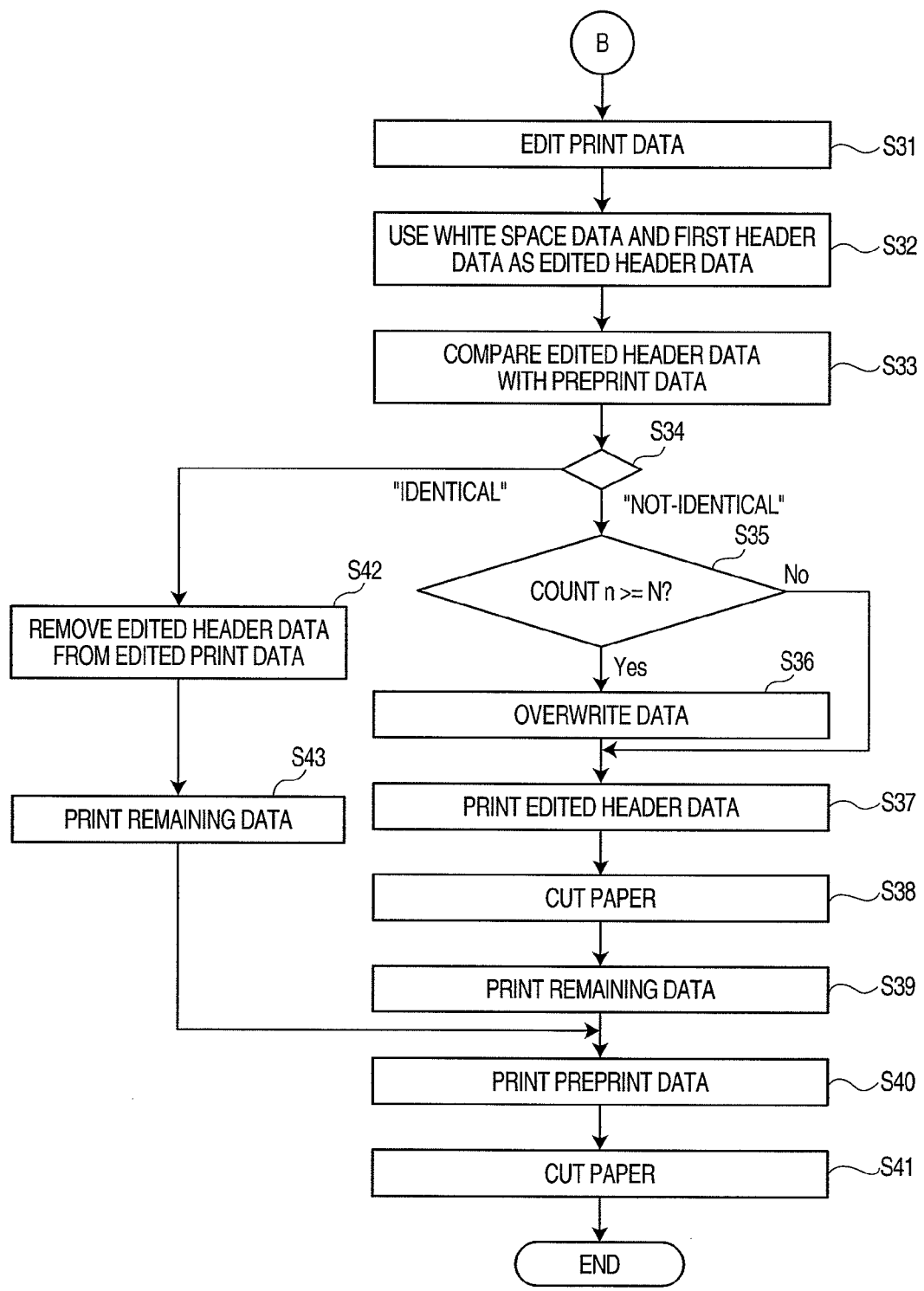
FIG. 12 is a flow chart of the printing process when a blank line is contained in the header data.

First, as shown in the flow chart in FIG. 12, the receipt printer 1 edits the print data when a blank line 53 is contained in the header data HD (S31).

Figures 13A, 13B:
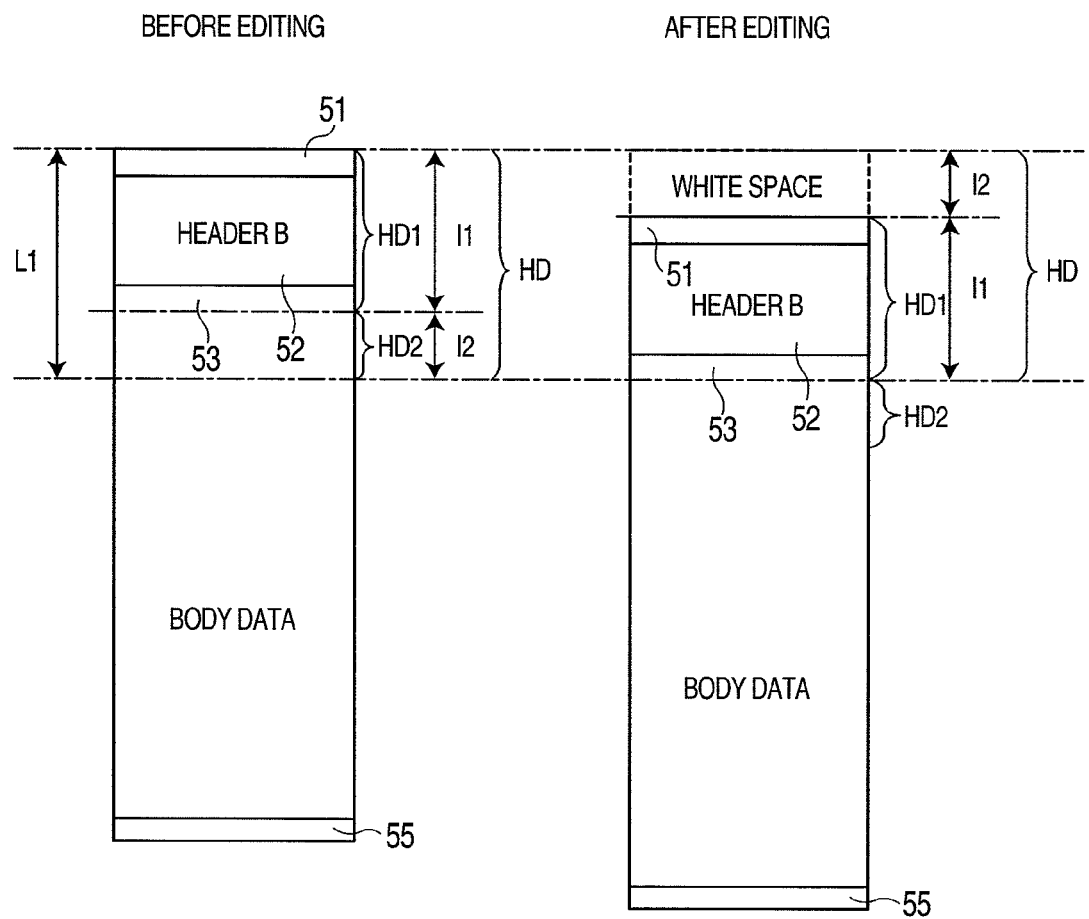
FIG. 13 describes editing the print data when a blank line is contained in the header data.
Figures 14A, 14B, 14C:
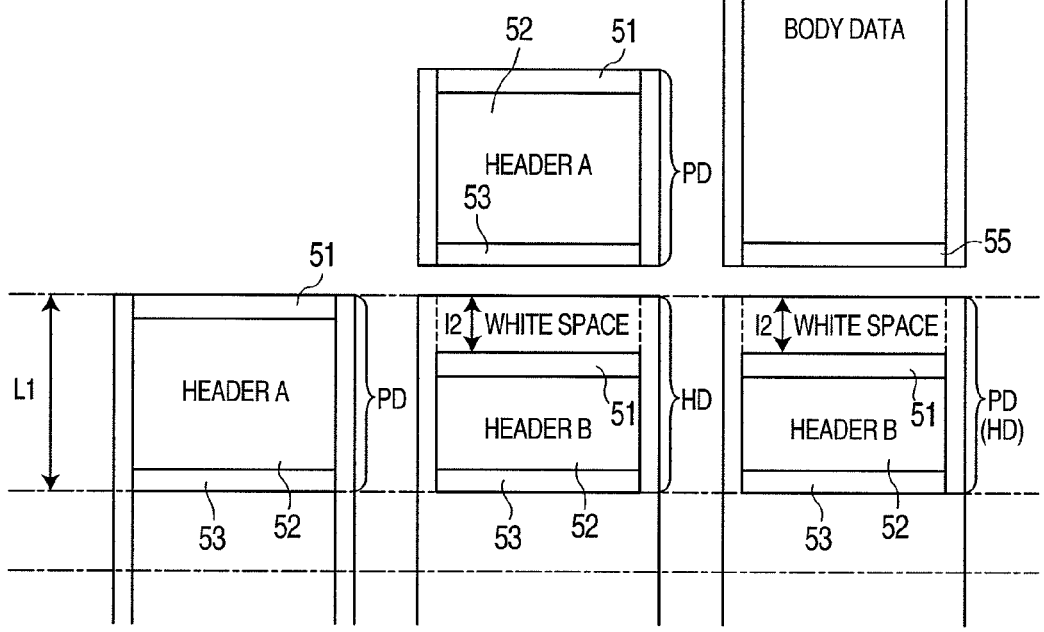
FIG. 14 shows a sample printout when a blank line is contained in the header data.

Editing the print data in step S31 in FIG. 12 is described with reference to FIG. 13. FIG. 13A shows the acquired print data. The receipt printer 1 (print data editor 35) separates the header data HD contained in the print data into first header data HD1 from the leading end of the header data HD to the trailing end of the blank line 53, and second header data HD2 from the trailing end of the blank line 53 to the trailing end of the header data HD. As shown in the figure, the length of the first header data HD1 is l1 and the length of the second header data HD2 is l2. FIG. 14B shows the print data after editing. The receipt printer 1 (print data editor 35) then adds white space data equal to the length l2 of the second header data HD2 to the leading end of the first header data HD1. As a result, white space of length l2 and first header data HD1 of length l1 are included in the data of length L1 from the leading end of the print data, or more specifically the header data HD of the print data after editing.

Referring again to FIG. 12, after editing the print data, the receipt printer 1 uses the white space data of length l2 and the first header data HD1 as the edited header data HD (S32). The edited header data HD and the preprint data PD are then compared (S33). If the edited header data HD and the preprint data PD are not identical (S34 returns NOT IDENTICAL), and the number of consecutive times n the edited header data HD and the preprint data PD are determined to be not identical is greater than or equal to specific count N (S35 returns Yes), the preprint data PD is rewritten with the edited header data HD (S36). The edited header data HD is then printed (S37) and the paper is cut (S38). The print data left after removing the edited header data HD from the edited print data is then printed (S39), the preprint data PD is printed (S40), and the paper is cut (S41).

However, if the edited header data HD and the preprint data PD are determined to be identical (S34 returns IDENTICAL), the edited header data HD is removed from the print data (S42), the remaining data is printed (S43), the preprint data PD is printed (S40), the paper is then cut (S41), and the process ends.

FIG. 14 shows a sample printout when the edited header data HD and preprint data PD are determined to be not identical in step S34 in FIG. 12, and the number of times n "not identical" is determined is greater than or equal to the specific number N in S35. The receipt printer 1 stores the top margin 51, header A as the header logo 52, and the blank line 53 as the preprint data PD. the header data HD extracted from the acquired print data is composed of white space, top margin 51, header B 52, and a blank line 53.

When print data is acquired after the preprint data PD is preprinted (FIG. 14A), the receipt printer 1 prints the edited header data HD and cuts the paper (FIG. 14B). The receipt printer 1 then prints the remaining data after removing the edited header data HD from the edited print data, and after printing the remaining data ends and before the paper is cut based on the cut command, the rewritten preprint data PD (edited header data HD) is preprinted, and the paper is cut after preprinting ends (FIG. 14C). As a result, when the length from the leading end of the print data to the trailing end of the blank line 53 is shorter than L1, the trailing end of the first header data HD1 after preprinting ends is coincident with the printing position by using data having white space equal to the length of the second header data HD2 added to the leading end of the first header data HD1 as edited header data HD, and storing the edited header data HD as the preprint data PD. When the next print job prints print data having the same header data HD, printing starts from the leading end of the body data 54, and creating lines as a result of the feed pitch shifting in the body data 54 can be prevented.

Figure 15:
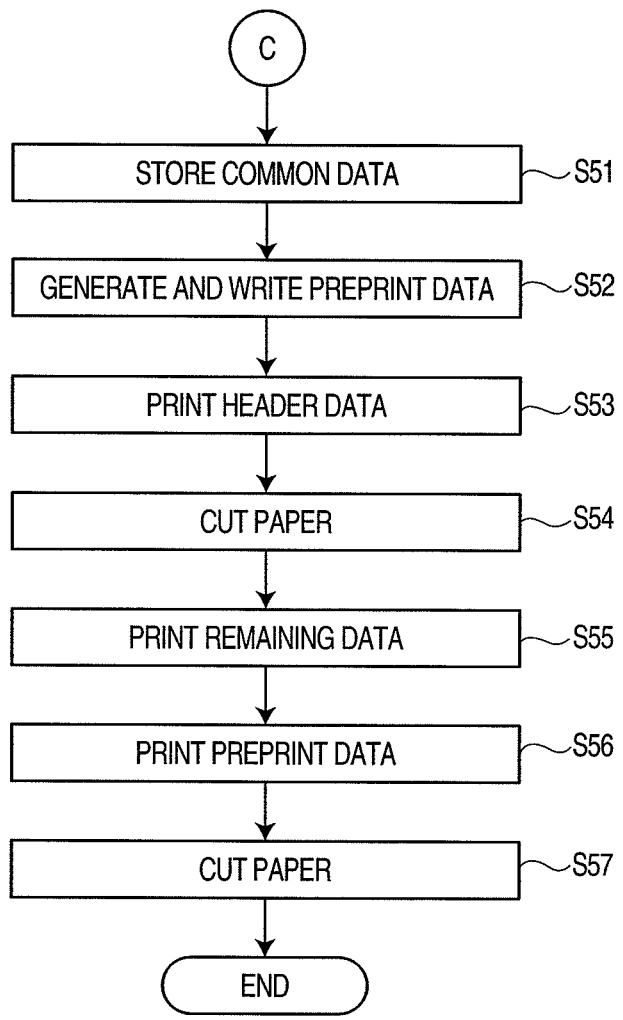
FIG. 15 is a flow chart of the printing process when common data is contained in the preprint data and the header data.

When the leading end parts of the header data HD and the preprint data PD are the same in step S11 in FIG. 7 is described next with reference to FIG. 15 and FIG. 16. As shown in FIG. 15, the receipt printer 1 stores data that is the same continuously from the leading end of the header data HD and the preprint data PD as common data in the common data storage unit 34 (S51). New preprint data PD is then generated, and the new data is saved as the preprint data PD (S52).

Generating the preprint data PD is described with reference to FIG. 16. As shown in the figure, the preprint data PD stored in the receipt printer 1 is composed of the top margin 51, a header logo 52 including header AB and header A, and a blank line 53 (FIG. 16A), and the header data HD is composed of the top margin 51, a header logo 52 including header AB and header B, and a blank line 53 (FIG. 16B). The receipt printer 1 (data generator 38) extracts (copies) the common data that is the same continuously from the leading end of the preprint data PD and the header data HD (that is, the top margin 51 and header AB in this example), and separates the common data into third header data HD3 from the leading end of the header data HD to the trailing end of the common data (header AB), and fourth header data HD4 from the trailing end of the common data to the trailing end of the header data HD (FIG. 16B). As shown in the figure, the length of the third header data HD3 is l3 and the length of the fourth header data HD4 is l4. White space of length l4, the length of the fourth header data HD4, is added to the leading end of the third header data HD3, and new preprint data PD composed of white space data of length l4 and the third header data HD3 is generated as the new preprint data PD (FIG. 16C). Note that "converted header data" as used herein refers to the new preprint data PD created by the data generator 38.

Returning to FIG. 15, the receipt printer 1 prints the acquired header data HD (S53) and cuts the paper (S54). The data remaining after removing the header data HD from the print data is then printed (S55), the newly created and rewritten preprint data PD is printed (S56), the paper is cut (S57), and the process ends.

Figures 17A, 17B, 17C:
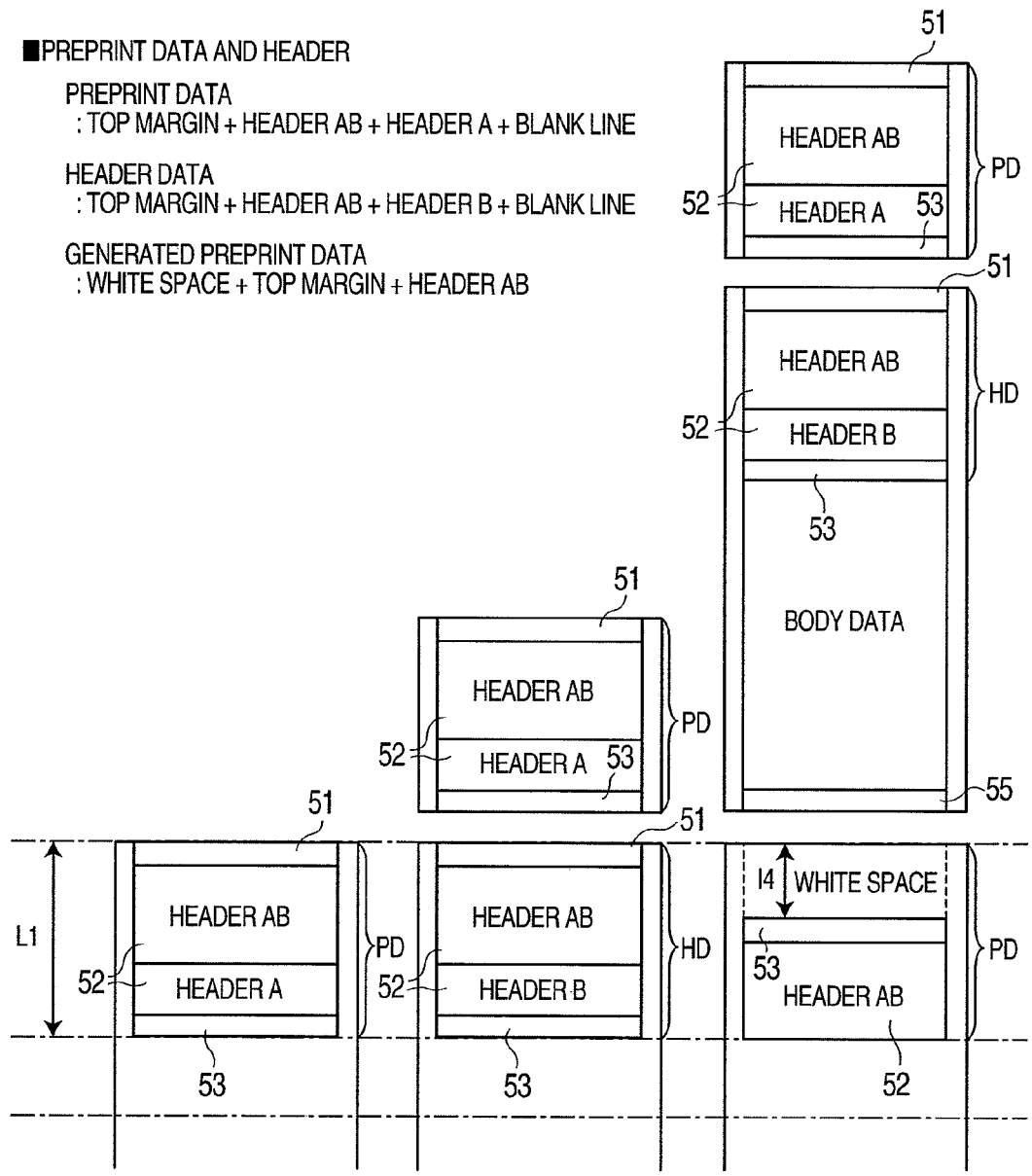
FIG. 17 shows a sample printout when common data is contained in the preprint data and the header data.

FIG. 17 shows the printout resulting from the process shown in FIG. 15. The preprint data PD and header data HD stored in the receipt printer 1 are the same as shown in FIG. 16, and the preprint data PD that is generated is composed of white space of length l4, top margin 51, and header AB. If the print data is acquired when the stored preprint data PD has been preprinted (FIG. 17A), the receipt printer 1 prints the header data HD contained in the print data because the preprint data PD and the header data HD are not identical, and cuts the paper (FIG. 17B). The remaining print data not including the header data HD is then printed, the newly generated preprint data PD (white space, top margin 51, and header AB) is preprinted after printing the remaining data ends and before cutting the paper based on the cut command, and the paper is then cut after preprinting ends (FIG. 17C).

Figure 18:
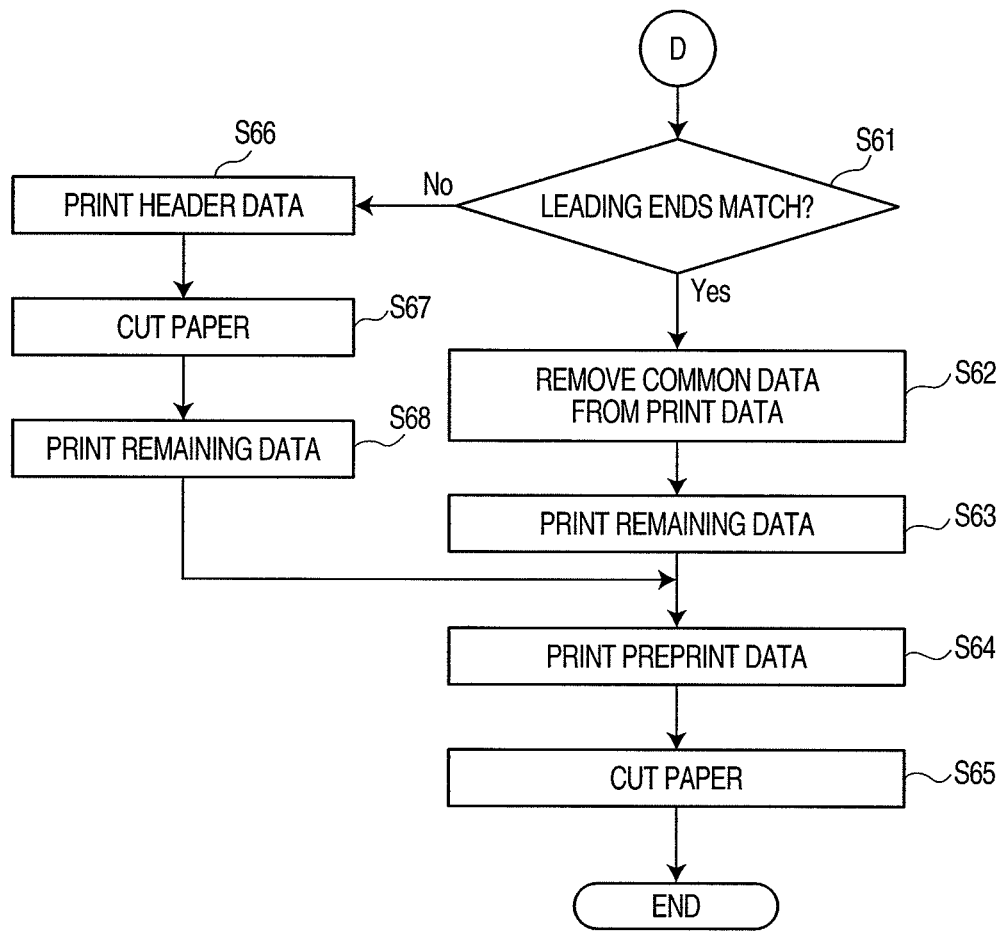
FIG. 18 is a flow chart of the printing process when common data is stored.
Figures 19A, 19B, 19C:
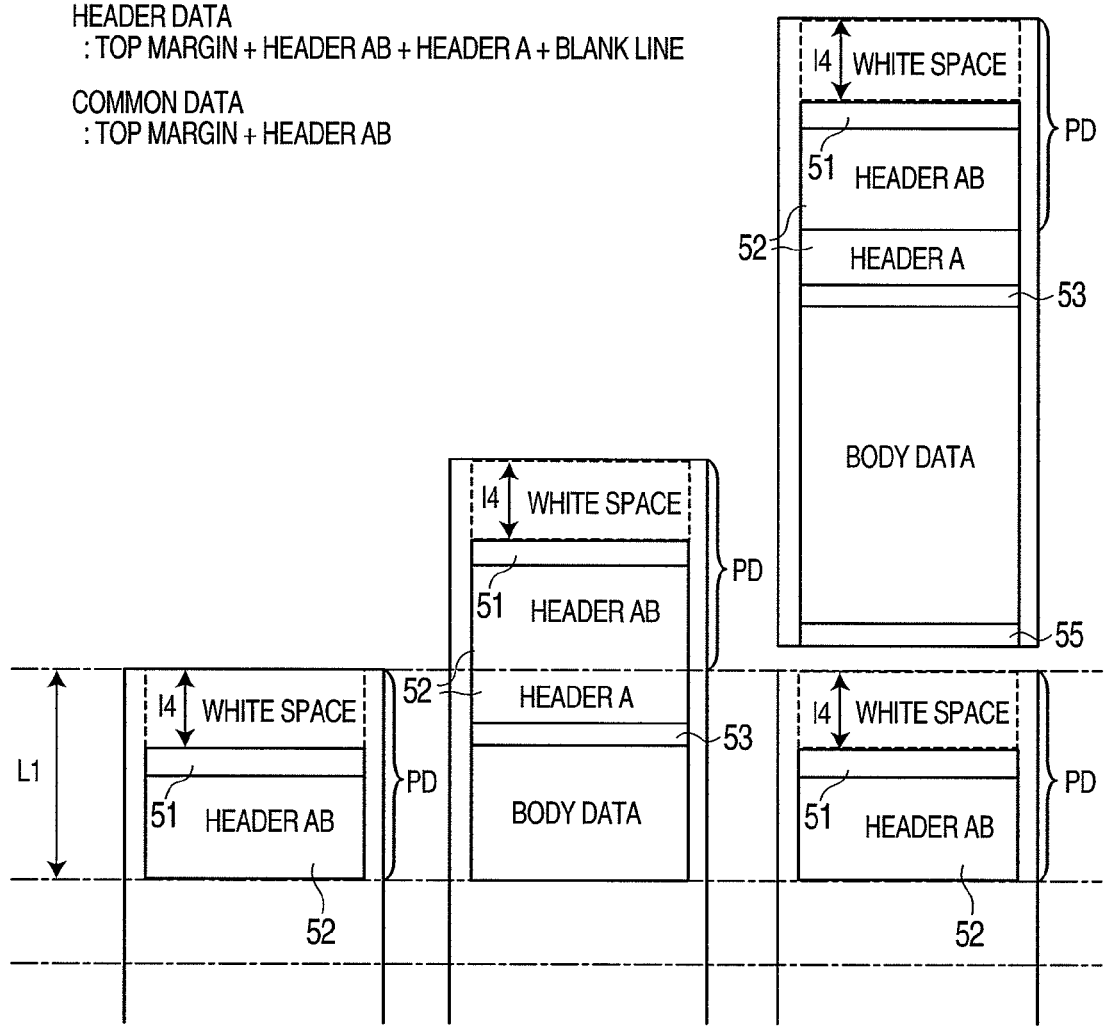
FIG. 19 shows a sample printout when common data is stored.

When step S05 in FIG. 7 determines that common data is stored in the common data storage unit 34 is described next with reference to FIG. 18 and FIG. 19. As shown in FIG. 18, the receipt printer 1 determines if the leading end part of the header data HD is the same as the common data stored in the common data storage unit 34 (S61). If the leading end of the header data HD and the common data match (S61 returns Yes), the common data is removed from the print data (S62), and the remaining data is printed (S63). The preprint data is then printed (S64), and the paper is cut (S65).

If the leading end of the header data HD and the common data do not match (S61 returns No), the header data HD is printed (S66), the paper is cut (S67), and the rest of the print data minus the header data HD is printed (S68). The preprint data is then printed (S64) and the paper is cut (S65).

FIG. 19 shows the printout when step S61 in FIG. 18 determines that the leading end part of the header data HD matches the common data. The receipt printer 1 stores white space of length l4, top margin 51, and header logo 52 as the preprint data PD. More specifically, the preprint data PD generated by the data generator 38 is stored. The top margin 51 and header AB are stored as the common data. The header data HD extracted from the acquired print data is composed of the top margin 51, header AB, header B and a blank line 53.

If print data containing common data (top margin 51 and header AB) is acquired when the preprint data PD has been preprinted (FIG. 19A), the receipt printer 1 prints the remaining print data minus the common data (FIG. 19B), preprints the preprint data PD (white space, top margin 51, and header AB) after finishing printing the remaining data and before cutting the paper based on the cut command, and then cuts the paper (FIG. 19C) after preprinting ends.

By thus storing data including common data as the preprint data PD, the next receipt can be printed using the preprinted common data even if the header data HD in the next print data to be printed and the preprint data PD do not completely match. As a result, the resulting top margin can be reduced from L1 to l4 even when the preprint data PD and the header data HD do not match.

The receipt printer 1 and the method of controlling a receipt printer 1 described above enable desirably printing a receipt without individually sending and rewriting the preprint data PD even when the header (the content printed in the top margin) content changes by comparing the header data HD contained in the received print data and the previously stored preprint data PD, and reprinting the header data HD contained in the print data only when the header data HD and the preprint data PD do not match. As a result, receipts can be continuously printed as desired without creating a top margin even when the presence or content of the header changes.

Considering cases in which the header data HD of print data having print data continuous to the border between the header data HD and other data is stored as the preprint data PD as shown in FIG. 4C and FIG. 4D, white space may be added to the leading end of the print data when the header data HD and preprint data PD are determined to be not identical and the header data HD is reprinted. Because the paper is cut above the white space when the unnecessary preprinted portion is cut off in this case, leaving part of the preprinted content at the leading end of the receipt can be prevented.

A configuration that recognizes the print data for one receipt using a specific text string instead of a cut command when print data for plural jobs is received is also conceivable.

A configuration that enables the user to desirably set the number N of consecutive "not identical" decisions that is used as the standard for rewriting the preprint data PD is also conceivable. In this case, providing a means of setting the count N is desirable.

Examples of print data containing a header logo 52 are shown in the embodiment described above, but the regular portion of the print data may be text data instead of image data.

Components of the receipt printer 1 described above can also be provided as a program. This program can also be provided stored on a storage medium (not shown in the figure). Examples of such storage media include CD-ROM, flash ROM, memory cards (such as Compact Flash®, smart media, memory sticks), Compact Disc media, magneto-optical discs, DVD media, and floppy discs.

The configuration of a receipt printer 1 and steps in the control method according to the invention are not limited to the foregoing, and can be varied in many ways without departing from the scope of the accompanying claims.

What is claimed is:

1. A receipt printer that has a paper cutting position disposed a specific distance downstream from the printing position, prints in a top margin equal to this specific distance in the next receipt after completing printing the print data for one receipt, and then cuts the paper, the receipt printer comprising:
    a preprint data storage unit that stores preprint data for printing in the top margin of the next receipt;
    a print data acquisition unit that acquires the print data from a host device;
    a header evaluation unit that determines if header data, which is the data in the top margin portion of the acquired print data, and the preprint data, are identical;
    a print control unit that controls a print unit and a paper cutter unit according to the result from the header evaluation unit, wherein when the result from the header evaluation unit is identical, the print control unit controls the print unit to print the preprint data after printing the remaining data, which is the acquired print data minus the header data, and then controls the paper cutter unit to cut the paper, and when the result from the header evaluation unit is not-identical, causes the print unit to print the preprint data after printing the acquired print data, and then causes the paper cutter unit to cut the paper; and
    a counter unit that counts the number of consecutive times the result from the header evaluation unit is not identical,
    wherein the data overwriting unit overwrites the preprint data when the count of the counter unit is greater than or equal to a specific number.

2. The receipt printer described in claim 1, further comprising:
    a data overwriting unit that, when the result from the header evaluation unit is not-identical, overwrites the preprint data with the header data of the acquired print data before the start of printing controlled by the print control unit.

3. The receipt printer described in claim 2, further comprising:
    a print data editing unit that, when a blank line at least one dot wide extending in the receipt width direction is contained in the header data, divides the header data into first header data from the leading end of the header data to the trailing end of the blank line, and second header data from the trailing end of the blank line to the trailing end of the header data, and adds white space data equal to the length of the second header data to the leading end of the first header data;
    wherein the data overwriting unit overwrites the preprint data with the first header data to which the white space data was added.

4. The receipt printer described in claim 2, further comprising:
    a data generating unit that, when the result from the header evaluation unit is not-identical and part of the header data and preprint data match, generates converted header data by converting the remaining part of the header data other than the matching part to white space data;
    wherein the data overwriting unit overwrites the preprint data with the converted header data.

5. The receipt printer described in claim 4, further comprising:
    a common data storage unit that, when the result from the header evaluation unit is not-identical and part of the header data and the preprint data match, stores the matching part as common data;
    wherein when data is stored in the common data storage unit, the header evaluation unit determines if the common data is contained in the header data of the acquired print data, and
    the print control unit controls the print unit to print the preprint data after printing the remaining data, which is the print data minus the common data, and then controls the paper cutter unit to cut the paper.

6. The receipt printer described in claim 1, wherein:
    when printing the acquired print data when the evaluation result is not-identical, the print control unit controls the paper cutter unit to cut the paper after causing the print unit to print the header data, and then controls the print unit to print the remaining data, which is the print data minus the header data.

7. The receipt printer described in claim 1, wherein:
    when printing immediately after a paper replacement process, paper feed process, or power on process, the print control unit controls the print unit to print the preprint data after printing the acquired print data regardless of the result from the header evaluation unit, and then controls the paper cutter unit to cut the paper.

8. The receipt printer described in claim 1, further comprising:
    a mode switching unit that changes the operating mode between a preprinting mode that prints the preprint data before cutting the paper, and a preprinting pause mode that does not print the preprint data before cutting the paper;

wherein the print control unit functions only in the preprinting mode.

9. A control method for a receipt printer that has a paper cutting position disposed a specific distance downstream from the printing position, prints in a top margin equal to this specific distance in the next receipt after completing printing the print data for one receipt, and then cuts the paper, the receipt printer comprising:

a preprint data storage step that stores preprint data for printing in the top margin of the next receipt;

a print data acquisition step that acquires the print data from a host device;

a header evaluation step that determines if header data, which is the data in the top margin portion of the acquired print data, and the preprint data, are identical;

a print control step that controls a print unit and a paper cutter unit according to the result from the header evaluation step, wherein when the result from the header evaluation step is identical, the receipt printer prints the preprint data after printing the remaining data, which is the acquired print data minus the header data, using the print unit, and then cuts the paper using the paper cutter unit, and when the result from the header evaluation step is not-identical, the receipt printer prints the preprint data after printing the acquired print data using the print unit, and then cuts the paper using the paper cutter unit; and a counter step that counts the number of consecutive times the result from the header evaluation step is not identical, wherein the data overwriting step overwrites the preprint data when the count of the counting step is greater than or equal to a specific number.

10. The control method for a receipt printer described in claim 9, further comprising:

a data overwriting step that, when the result from the header evaluation step is not-identical, overwrites the preprint data with the header data from the acquired print data before the start of printing controlled by the print control step.

11. The control method for a receipt printer described in claim 9, wherein:

when printing the acquired print data when the evaluation result is not-identical, the print control step controls the paper cutter unit to cut the paper after causing the print unit to print the header data, and then controls the print unit to print the remaining data, which is the print data minus the header data.

12. A non-transitory computer-readable recording medium storing a program that causes a computer to execute the steps of the receipt printer control method described in claim 9.

* * * * *